Patented Nov. 21, 1939

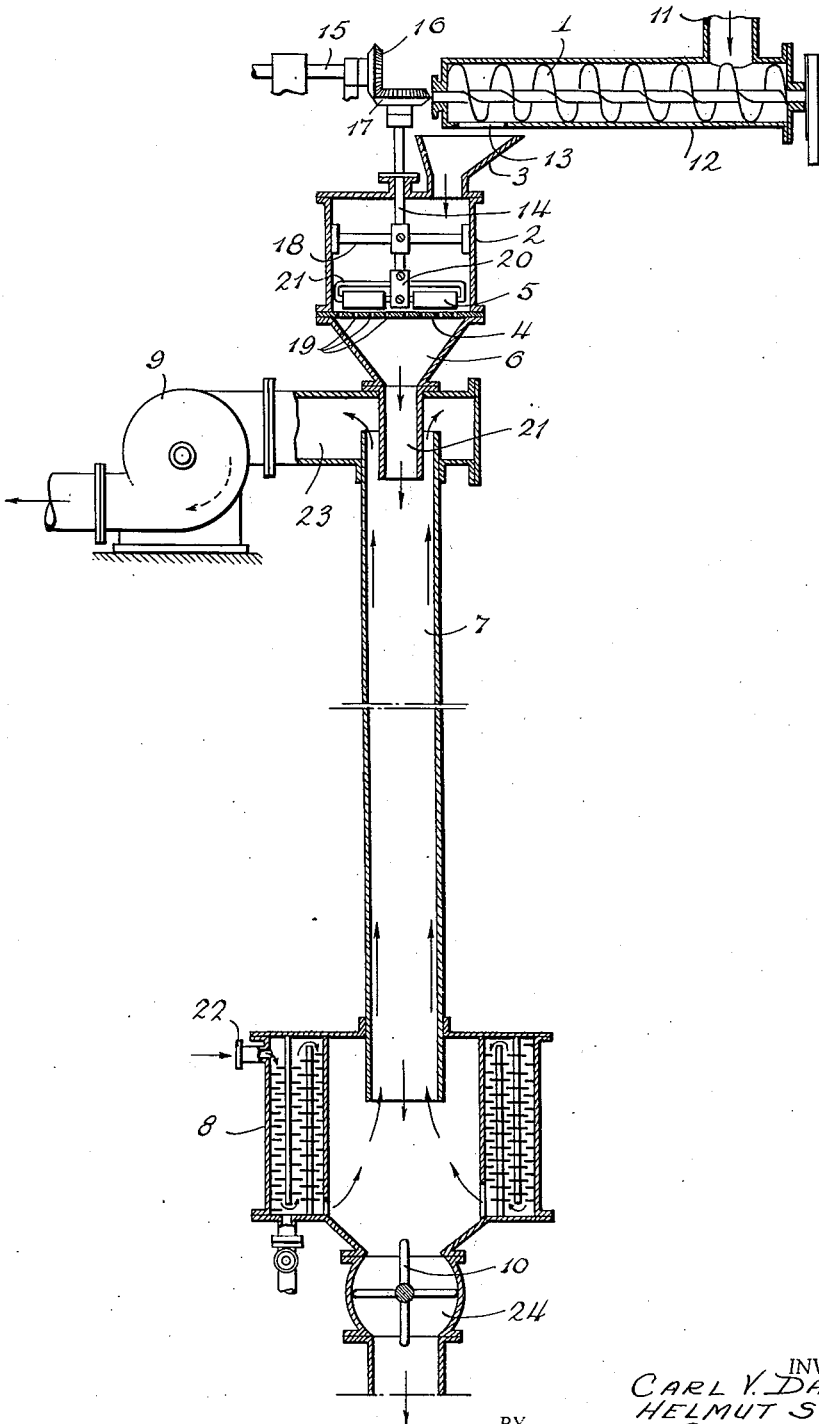

2,180,968

UNITED STATES PATENT OFFICE 2,180,968

PROCESS AND MEANS FOR DRYING STARCH

Helmut Schorn, Dillingen-Saar, and Carl Victor Daumas, Dusseldorf, Germany, assignors to N. V. "Agratherm", Amsterdam, Netherlands, a corporation of the Netherlands Application September 1, 1936, Serial No. 98,864

3 Claims. (Cl. 34—24)

This invention relates to a process and means for drying starch, and refers more particularly to a process for drying raw starch which has been treated in a centrifugal machine, and to an apparatus for carrying out such process.

At the present time, the methods of manufacturing common or fine starch consist of a number of separate steps or processes. One of the most important of these steps is the process of drying raw starch after the latter has been treated in a centrifugal machine. This drying requires a large amount of space and time, is very expensive and must be carried out with exceptional care and precision under very low temperatures, as otherwise the starch can easily coagulate, deteriorate or become spoiled. In spite of such care, the starch obtained after the drying process consists of large particles or lumps of unequal size which do not dissolve readily in water.

An object of the present invention is to improve a drying process of this type, to diminish its costs and to eliminate or diminish the danger that the starch may be damaged in the course of the drying.

Another object is the provision of a process and means for successfully and effectively drying starch within a comparatively short time.

The present invention involves the practical application of the scientific principle that when a moisture-containing body is brought in contact with very dry gases, an evaporation of this moisture takes place, whereby the heat energy necessary for such evaporation is used up by the moisture-containing body, so that this body is cooled in relation to said gases. The time necessary for the evaporation depends upon the size of the surfaces of the moisture-containing body which are in contact with the gases, and upon the capacity of the gases to take in the evaporated moisture. On the other hand, the time necessary for the evaporation is dependent upon the temperature and the amount of the gases used as the drying media.

The above and other objects of the present invention may be realized through the application of said principle by passing the starch through a jet of a hot gas in counter-current relationship to the direction of flow of said gas.

It is advisable to increase the surfaces of contact between the starch and the hot gas by comminuting the starch prior to the drying. Preferably, the starch may be comminuted to form small spheres or rods having diameters ranging between 0.4 and 0.8 millimeter. When the starch is comminuted in this manner, the contacting surfaces are increased to a very large extent while no large spaces are necessary for the purpose of carrying out the drying process.

Raw starch prior to the drying has from 40 percent to 50 percent of water. One of the main difficulties encountered in carrying out prior art drying methods consists in that when starch is heated above a certain temperature while containing a certain percentage of water, the starch will coagulate and may become deteriorated. When the starch contains less water it may be heated to the same temperature, or even higher, without coagulating.

In accordance with the present invention the danger of coagulation is avoided by keeping the starch in contact with the gases for a very short time, and by using well comminuted starch to increase as much as possible the contact areas between the starch and the hot gases.

The invention will appear more clearly from the following detailed description when taken in connection with the accompanying drawing showing by way of example, a preferred embodiment of the inventive idea.

The drawing is a diagram showing a starch drying device partly in vertical section and partly in side elevation.

The raw starch is introduced through a pipe 11 into a horizontal pipe 12 containing a spiral screw 1 which is driven by any suitable means not shown in the drawing. The starch within the pipe 12 is transported by the spiral screw 1 to an opening 13 formed in the pipe 12.

The starch falls through the opening 13 into a trough 3 and passes into the interior of a container 2. A central vertical shaft 14 is situated within the container 2 and is driven by means of a shaft 15 carrying a gear wheel 16 which meshes with the gear wheel 17 mounted on the shaft 14. The shaft 14 is provided with arms 18 which rotate within the container 2 so that the starch within the container 2 is continuously stirred or agitated by the arms 18.

The bottom of the container 2 is formed by a thin plate 4 consisting of high quality metal or alloy and provided with a large number of small openings 19, the diameter of which may be 0.8 millimeter or less. A sleeve 20 is mounted upon the lower end of the shaft 14 and is rotatable along with this shaft. The sleeve 20 carries arms 21 supporting the rollers 5 which are moved by the shaft 14 over the upper surface of the plate 4.

The starch which falls upon the plate 4 is pressed through the openings 19 by the rollers 5 which are moved over the plate 4 with an adjustable constant speed.

The starch particles which have passed through the openings 19 are uniform in shape and may have a spherical or cylindrical form. These starch particles fall into the trough 6 and pass through a pipe 21 into a vertical pipe or chamber 7 having a larger diameter than that of the pipe 21. The pipe 7 may have a length of at least five meters.

The lower end of the pipe 7 is enclosed by a heating chamber 8 which is heated by any suitable means not shown in the drawing. Air is introduced into the chamber 8 through a pipe 22 and is heated therein.

The upper end of the vertical pipe 7 is enclosed by a pipe 23 which is connected with a suction device 9.

The air may be heated in the chamber 8 to a temperature of up to 300° C. and flows upward through the pipe 7 counter-current to the direction of the comminuted starch which slowly falls downward through the pipe 7. The heated air dries the starch and is removed through the suction device 9. The dried starch falls into the chamber 8 and is removed through a chamber 24 provided with rotatable surfaces 10, so that any further supply of air to the dried starch may be cut off.

The pipe 7 may contain means for guiding the falling starch or the flow of the hot air or gas.

Example

Corn starch which has been treated in a centrifugal machine contains about 40 percent water. When this starch is passed through the openings 19 having a diameter of 0.8 millimeter, it forms spherical particles of the same diameter. These particles are dried in the pipe 7 by air heated to a temperature of 300° C. and flowing counter-current to the direction of movement of the starch particles with a velocity of two meters per second. The dried particles which slowly drop into the chamber 24 contain about 10 percent of water. The heated air is cooled while in contact with the starch particles and leaves the suction device 9 at a temperature of about 80° C.

The described drying process may be conveniently combined with the process of disintegrating starch particles to render them soluble by fusion, of the type described in our co-pending patent application Serial Number 86,322, filed June 20, 1936. This drying process may be also combined with a partial disintegration of the starch particles, for example, by bringing starch particles containing a large percentage of moisture with gases which are heated to a very high temperature. As a result of such combined drying and partial disintegration the so-called industrial starch may be produced.

The described drying process eliminates the use of expensive and complicated machinery which contained means separating the starch from the drying medium, special drying chambers and filtering devices.

What is claimed is:

1. The process of drying starch, which comprises drying raw comminuted starch by dropping it through a gas having a temperature of about 300° C. and flowing counter-current to the direction of movement of the raw starch to cause the starch to remain a comparatively short time in contact with said gas.

2. The process of drying starch, which comprises dropping starch particles through a hot gas and simultaneously creating a suction to cause said gas to flow counter-current to the direction of movement of the raw starch.

3. A device for drying starch, comprising an elongated vertical pipe, means for comminuting starch situated over the upper end of said pipe, said starch falling through said pipe, means connected with the lower end of said pipe for introducing a hot gas into said pipe, means causing said hot gas to flow countercurrent to the direction of movement of the starch, means situated below the second-mentioned means for removing the starch, the last-mentioned means preventing a further supply of air to the starch.

HELMUT SCHORN.
CARL VICTOR DAUMAS.